United States Patent
Poncelet et al.

(10) Patent No.: US 6,290,433 B2
(45) Date of Patent: Sep. 18, 2001

(54) DISTRIBUTION SYSTEM FOR CONVEYING AIR-ENTRAINED MATERIAL

(75) Inventors: Robert Poncelet, Viscount; Russell James Memory, Saskatoon; Hughie Douglas Kydd, Saskatoon; Montgomerie Blair Summach, Saskatoon, all of (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/750,120

(22) Filed: Dec. 29, 2000

Related U.S. Application Data

(62) Division of application No. 09/244,667, filed on Feb. 4, 1999.

(30) Foreign Application Priority Data

Feb. 6, 1998 (GB) .................................................. 9802527

(51) Int. Cl.⁷ .................................................. B65G 51/18
(52) U.S. Cl. .................................................. 406/181
(58) Field of Search ...................... 406/181; B65G 53/52

(56) References Cited

U.S. PATENT DOCUMENTS

| | | | |
|---|---|---|---|
| 1,850,937 | * | 3/1932 | Messinger ............................ 406/181 |
| 1,871,853 | * | 8/1932 | Kennedy ............................ 406/181 |
| 2,171,205 | | 8/1939 | Zinke ..................................... 43/148 |

(List continued on next page.)

FOREIGN PATENT DOCUMENTS

| | | |
|---|---|---|
| 437160 | 7/1968 | (AU) . |
| 867226 | 3/1971 | (CA) . |
| 1040483 | 10/1978 | (CA) . |
| 1060720 | 8/1979 | (CA) . |
| 1081543 | 7/1980 | (CA) . |

(List continued on next page.)

OTHER PUBLICATIONS

Great Plaines Drill Catalog "Specialists in the Science of Seed Placement", dated Apr. 8, 1997 (Reference to p. 49.
Accord "Pneumatic Seed Drill . . . Sow Simply Everything with the Central Metering", No date (Reference to Cover Page).

*Primary Examiner*—Christopher P. Ellis
*Assistant Examiner*—Joe Dillon, Jr.
(74) *Attorney, Agent, or Firm*—Larry W. Miller; John William Stader

(57) ABSTRACT

An improved conveyor tube and distribution header for air conveyors such as air seeders serves to distribute seed and/or fertilizer products from the aircart to individual delivery tools via pneumatic conveyor tubes. The apparatus is adapted to achieve substantially even distribution of the materials being conveyed to each of the delivery tools. The apparatus includes a conveyor tube for conveying air-entrained material from a first location to a distribution head, which conveyor tube has an interior surface with a plurality of inwardly directed spaced apart projections which are disposed in spaced annular rows extending around the lengthwise axis of the tube for creating controlled turbulence in the flow of material. These projections are arranged in a particular manner to achieve the desired degree of turbulence. The distribution head has a flow inlet for receiving the air-entrained material from the conveyor tube and the head includes angularly spaced apart outlet ports and a flow divider device for dividing the incoming flow into generally equal parts and directing the divided portions of flow outwardly through the outlet ports. The flow divider includes a flow deflector disposed within a flow dividing chamber which deflector has flow confining ridges separated by smoothly contoured valleys arranged to divide and direct the flow in a smooth and efficient manner.

5 Claims, 14 Drawing Sheets

U.S. PATENT DOCUMENTS

| | | | |
|---|---|---|---|
| 3,189,230 | 6/1965 | Gillespie | 222/193 |
| 3,631,825 | 1/1972 | Weiste | 111/11 |
| 4,024,822 | 5/1977 | Ross | 111/34 |
| 4,191,500 | 3/1980 | Oberg | 406/146 |
| 4,413,935 | 11/1983 | Smith | 406/181 |
| 4,530,462 * | 7/1985 | Andersson | 406/181 |
| 4,562,968 | 1/1986 | Widmer | 239/655 |
| 4,575,284 | 3/1986 | Kelm | 406/87 |
| 4,685,843 | 8/1987 | Kelm | 406/181 |
| 4,717,289 | 1/1988 | Popowich | 406/122 |
| 6,155,752 * | 12/2000 | Buhlmann | 406/181 |
| 6,220,793 * | 4/2001 | Meyer | 406/181 |

FOREIGN PATENT DOCUMENTS

| | | | |
|---|---|---|---|
| 1097149 | 3/1981 | (CA) . | |
| 1154323 | 9/1983 | (CA) . | |
| 1167704 | 5/1984 | (CA) . | |
| 2073237 | 6/1991 | (CA) . | |
| 2111611 | 6/1995 | (CA) . | |
| 211295 | 2/1987 | (EP) . | |
| 571212 | 9/1977 | (RU) . | |
| 694116 | 10/1979 | (RU) . | |
| 757443 | 8/1980 | (RU) . | |
| 801771 | 2/1981 | (RU) . | |
| 1496668 | 7/1989 | (RU) . | |
| 934689-A2 * | 11/1999 | (WO) | A01C/7/08 |

* cited by examiner

| Fig. 6A |
| --- |
| Fig. 6B |

Fig. 16A

| Fig. 16 | Fig. 16A | Fig. 16B |
|---|---|---|

TABLE II

| DIMPLE TUBE REFERENCE | DESIGN | OA |
|---|---|---|
| ELBOW BEND ANGLE (°) | 75 | 75 |
| NUMBER OF ROWS | 6 | 6 |
| NUMBER OF COLUMNS | 12 | 12 |
| DIMPLE DEPTH | 3/16 | 1/4 |
| DIMPLE DIAMETER (") | 1/2 | 1/2 |
| OFFSET (") | 30 | 30 |
| TOP SPACE (") | 2 1/2 | 3 |
| BOTTOM SPACE (") | 2 1/2 | 1 |
| SPACING BETWEEN ROWS (") | VARYING (1) | 2 |
| DIMPLE TUBE HEIGHT (") | 14 | 14 |
| DIMPLE TUBE OUTER DIAMETER (") | 2 1/2 | 2 1/2 |
| PRODUCT | RATE (LB/ACRE) | CV(%) | RATE (LB/ACRE) | CV(%) |
| FERTILIZER | 350 | 6 | 215 | 2.96 |
| WHEAT | 61.3 | 4.5 | 90 | 4.63 |
| CANOLA | 7.4 | 4.1 | 6.6 | 2.45 |
| PEAS | 85.6 | 4.6 | - | - |
| CLAY BASE | - | - | - | - |
| BARLEY | 89.4 | 3.8 | - | - |

NOTE: (1) BEGINNING WITH THE BOTTOM ROW, THE SPACINGS BETWEEN THE ROWS WERE 2 1/4, 2, 1 1/2, 1 1/2, 1 1/2 INCHES, I.E. THE SPACINGS DECREASED TOWARD THE OUTLET ENDS.

(2) BEGINNING WITH THE BOTTOM ROW, THE SPACINGS BETWEEN THE ROWS WERE 2 1/2, 2 1/2, 2, 1 1/2, 1 1/2, 1 1/2 INCHES, I.E. THE SPACINGS DECREASED TOWARD THE OUTLET ENDS.

Fig. 16B

| RA | | PG | | T1 | | T0 | |
|---|---|---|---|---|---|---|---|
| RATE (LB/ACRE) | CV(%) | RATE (LB/ACRE) | CV(%) | RATE (LB/ACRE) | CV(%) | RATE (LB/ACRE) | CV(%) |
| 75 | | 75 | | 75 | | 75 | |
| 5 | | 7 | | 7 | | 7 | |
| 12 | | 12 | | 12 | | 12 | |
| 1/4 | | 1/4 | | 1/4 | | 5/16 | |
| 1/2 | | 1/2 | | 1/2 | | 1/2 | |
| 30 | | 30 | | 30 | | 30 | |
| 2 3/4 | | 4 1/4 | | 2 1/4 | | 2 1/4 | |
| 1 1/4 | | 3/4 | | 1/2 | | 1/2 | |
| 2 1/2 | | 1 1/2 | | VARYING (2) | | VARYING (2) | |
| 14 | | 14 | | 14 | | 14 | |
| 2 1/2 | | 2 1/2 | | 2 1/2 | | 2 1/2 | |
| 120 | 3.33 | - | - | 240 | 4.53 | 340 | 3.53 |
| 90 | 4.13 | 60 | 4.37 | 90 | 6.13 | 90 | 5.66 |
| 5.04 | 5.07 | 6 | 4.47 | 5.67 | 3.16 | 5.6 | 3.26 |
| - | - | - | - | 128 | 4.68 | 184 | 5.5 |
| - | - | - | - | 20.96 | 4.7 | - | - |

DISTRIBUTION SYSTEM FOR CONVEYING AIR-ENTRAINED MATERIAL

CROSS REFERENCE TO RELATED APPLICATIONS

This application is a divisional application of U.S. application Ser. No. 09/244,667, filed Feb. 4, 1999. The entirety of that parent application is incorporated herein by reference.

FIELD OF THE INVENTION

This invention relates to improved apparatus for the delivery of particulate material, which apparatus is specially adapted for use with an agricultural pneumatic conveyance device such as an air seeder.

BACKGROUND OF THE INVENTION

Seed and fertiliser products are distributed from a hopper or aircart to a delivery tool via a pneumatic conveyor tube. The travel path is initially substantially lateral over the first part of the distance from the supply hopper to the delivery tool. Then, the conveyor tube is provided with a substantially vertical orientation and its upper end connects with a flow dividing header. The header directs the air-entrained product into a number of conduits connected with the ground openers and delivery tools. In some cases the conduits of the header communicate with secondary headers before distributing the product to individual delivery tools. It is important to achieve an even distribution of product to each conduit from the header to apply equal amounts of product in each furrow. An uneven distribution results in inefficient soil and fertiliser usage, and affects the uniformity of the produce growth. A term commonly used is the coefficient of variation (CV) which is a measure of the uniformity of distribution across the distribution apparatus. A CV of 15% or greater is deemed unacceptable. A CV below 5% is considered very good.

The variation in distribution is effected by a number of factors. For instance, grain travelling in the conveyor tube tends to travel along the inside surface, particularly following any bend for redirection to vertical. The outlet of the conveyor tube delivers the material to a spreader in the distribution header which separates the material into channels arranged circumferentially about the header. Thus, if the product material is more heavily concentrated at one side of the conveyor tube, distribution will not be even. To deliver the product more evenly into the header, a number of designs have been proposed to create turbulence in the conveyor tube forcing the product away from the inside surface, and to centre the stream of product entering the header.

U.S. Pat. No. 4,717,289 issued to S. Popowich in 1988 discloses a corrugated delivery tube for use with a horizontal distribution head. Corrugations tend to direct material from the side walls in a substantially horizontal system with gravity also affecting the stream. In a substantially vertical orientation, many materials may follow the corrugated surface without experiencing enough turbulence to achieve the desired result.

A vertical header system allows a larger number of separation channels to be arranged circumferentially, without constricting the size of the channels which constriction would increase the pressure requirements and potentially cause more damage to the seed.

Canadian Application No. 2,111,611 to G. Bourgault published in June 1995 discloses the use of a central baffle to divide the material into two streams as it is redirected through a 90 degree bend and centering deflector rings. This is a relatively complicated structure to manufacture. Further, the seed and other material is exposed to a plurality of deflecting surfaces and since they are travelling at high speed this increases the possibility of damaging the seed in particular.

The use of a dimpled distribution tube is disclosed in Canadian Patent 1,167,704 issued to D. Kelm in 1984. A regular pattern of dimples, or interior projections, creates turbulence within the material flow. This design includes a number of variations in an attempt to improve the uniformity of distribution. Both cylindrical and conical tube sections are disclosed having regularly spaced dimples. An alternative embodiment places a dimpled section between two 45 degree bend sections to act on the material more gradually. This design improves the distribution of material considerably over the previous designs. However, the CV results of the Kelm device are somewhat inconsistent depending on the product used and the rate of delivery.

Various product materials, e.g. peas, wheat, canola and fertilisers exhibit different responses to turbulent flow. The objective is to provide a uniform stream of material to the dividing spreader of the header. Since any number and combination of materials may be distributed by the same equipment, it is desirable to find an optimised median system suitable for the full range of products to provide the necessary versatility.

Kelm identified that changing the placement of the dimpled tube section within the conveying system has an effect on the CV from the distribution head. However, it is not practical to reconfigure the conveying system for different products or application conditions.

The distribution head design also has a substantial effect on the CV. The prior art has provided a wide variety of distribution heads. Some heads promote turbulence in the flow while others make attempts to reduce turbulence in the head. Reference may be had to Kelm CA 1,097,149; Weiste AU 437,160; EP 211,295; Wurth SU 1,496,668; Gillespie U.S. Pat. No. 3,189,230; Oberg et al U.S. Pat. No. 4,191,500; Smith et al U.S. Pat. No. 4,413,935; Widmer et al U.S. Pat. No. 4,562,968 and Memory CA 2,073,237-A among others. Although several of these designs were partially successful it is the opinion of those skilled in this field that there is room for improvement insofar as effect on CV is concerned.

SUMMARY OF THE INVENTION

It is an objective to provide improved conveyor tubes and distribution heads for producing more even product distribution despite changing variables including product size, shape, density and mixture.

The present invention in one aspect relates generally to a conveyor tube for use in a distribution system for conveying air-entrained material between a first location to a distribution head, which has an interior surface with a plurality of inwardly directed spaced apart projections, said projections forming a plurality of spaced annular rows which extend around a lengthwise axis of the tube for creating controlled turbulence in the flow of material.

According to one feature of the invention, the space between at least some of the annular rows of projections decreases from one end toward another end of the conveyor tube.

According to another aspect of the invention the space between said annular rows of projections decreases in the direction of flow of the material through the conveyor tube from an inlet portion to an outlet portion thereof. Stated differently, annular rows nearer an end of the conveyor tube which is closest to the distribution head, when in use, are preferably more closely spaced than the rows closest to the first location. This helps provide adequate turbulence and acceptable CVs for a wide range of products.

According to another preferred feature the projections forming the plurality of annular rows may be arranged such that projections forming one row are angularly offset about the lengthwise axis of the tube with respect to the projections of an adjacent row. This helps to ensure that all particles of the material being conveyed are subjected to turbulence.

The conveyor tube advantageously includes a straight section of uniform diameter adapted to be vertically positioned when in use and having said rows of projections formed therein, said projections being of uniform depth and having their inner extremities concentrically positioned about the central lengthwise axis of the tube.

Further preferred features include a smoothly curved elbow section leading into an inlet portion of said straight section with said straight section having a first space devoid of projections between the elbow section and a first row of said projections at said inlet portion and a second space devoid of projections between the last row of said projections and an outlet end of the straight section.

Preferably said second space is not less than about 2 to 3 inches long, the total length of said straight section preferably being about 12 to 16 inches.

Advantageously said elbow section has a bend angle not greater than about 75 but the bend angle can vary between 70 degrees and 90 degrees.

The inwardly directed extremities of said projections in one preferred embodiment lie in a base circle having a nominal diameter of approximately 2 inches. Stated more accurately the diameter of said base circle may be about 1.97 to 2.0 inches, said tube having a nominal diameter of about 2.5 inches.

Typically said projections are of a semi-spherical or bulbous shape and 4 to 8 rows of said projections may be provided. Said projections are also typically arrayed in columns, there being 8 to 12 columns spaced equally around the circumference of the conveyor tube. In a preferred embodiment there are 6 rows and 12 columns of said projections.

A distribution system for conveying air-entrained material in accordance with another aspect of the invention comprises an improved distribution head which is well-suited for use with the conveyor tube as described above. This distribution head has a flow inlet for receiving the air-entrained material from said conveyor tube, a plurality of angularly spaced apart outlet ports and flow divider means for dividing the incoming flow into generally equal parts and directing the divided portions of the flow outwardly through the respective outlet ports. The flow divider means may include a flow divider chamber defined within said distribution head and a flow deflector disposed within said chamber and having flow confining ridges thereon separated by smoothly contoured valleys each associated with a respective one of said outlet ports.

The distribution head in the preferred embodiment defines a central axis with said flow inlet being aligned with and concentric with said central axis and said outlet ports being in said angularly spaced apart relation and extending radially outwardly from said central axis, said flow deflector having a nose centered on said central axis and said flow confining ridges commencing downstream of said nose and curving gradually around from combined axial and radial directions adjacent said nose into generally radial directions while the contoured valleys between said ridges gradually become deeper to ultimately merge with interior surfaces of the outlet ports.

The outlet ports preferably are of circular cross-section and are equally angularly spaced about said central axis with said outlet ports extending normal to said central axis and lying in a common plane.

The distribution head advantageously may include three main sections namely, a bottom section having said inlet therein and having first recesses defining the bottom halves of said ports, a top section adapted to matingly engage said bottom section and having second recesses complementing said first recesses to define said outlet ports, and an insert section defining said flow deflector adapted to seat in said top and bottom sections with said nose portion directed toward said flow inlet and axially aligned therewith.

Preferably said flow inlet tapers inwardly in the flow direction to accelerate and centre the flow before it meets the flow deflector.

Further features of the invention will become apparent from the following description of preferred embodiments of the invention.

BRIEF DESCRIPTION OF THE DRAWINGS

FIG. 16 is a table of design data and test results referred to below as Table II.

DETAILED DESCRIPTION OF THE PREFERRED EMBODIMENTS

Figure 1:
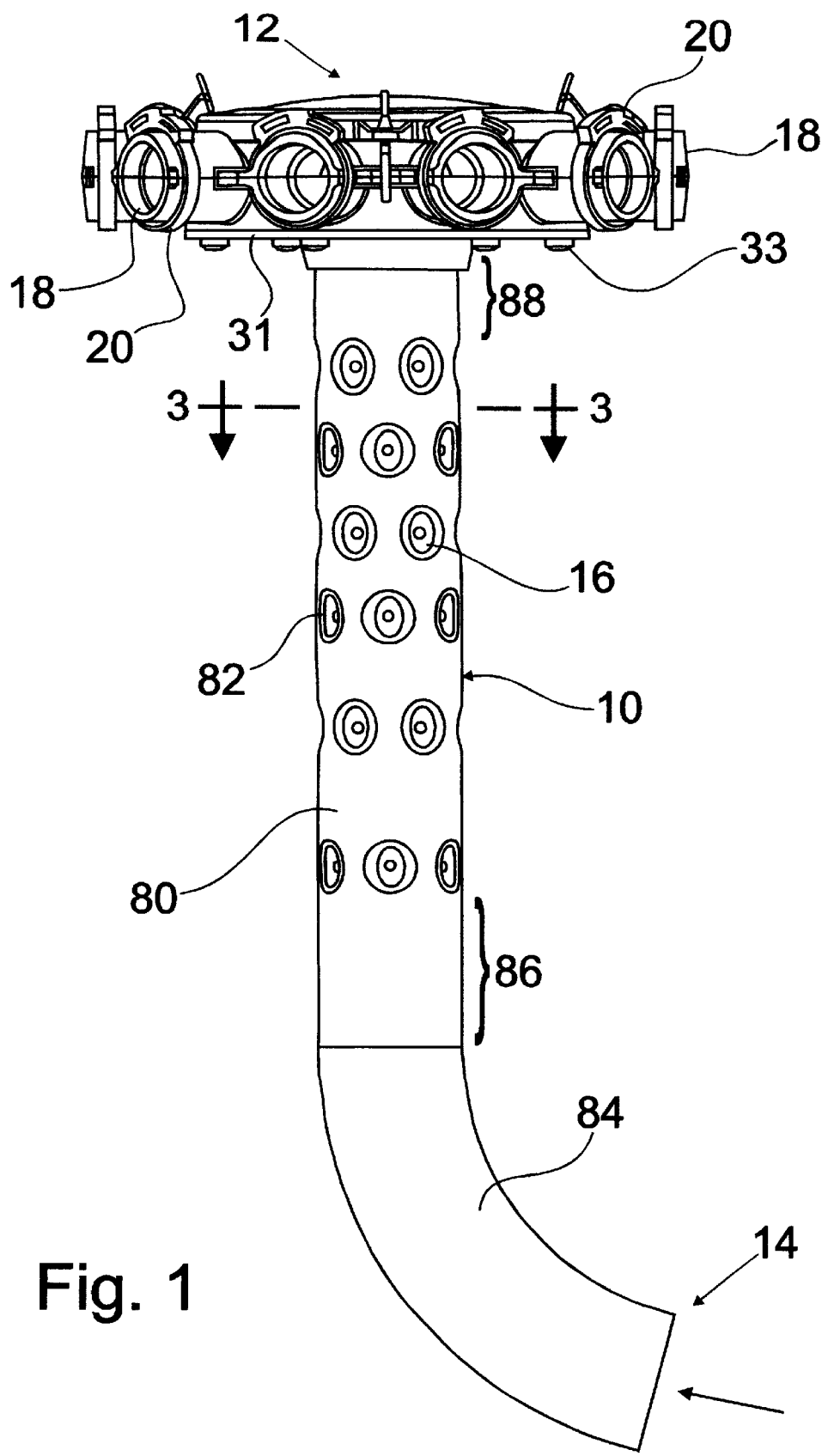
FIG. 1 is a side elevation view of the conveyor tube in accordance with a preferred embodiment of the invention and having a distribution head, also in accordance with a preferred embodiment of the invention, mounted at the upper end of the conveyor tube.
Figure 2:
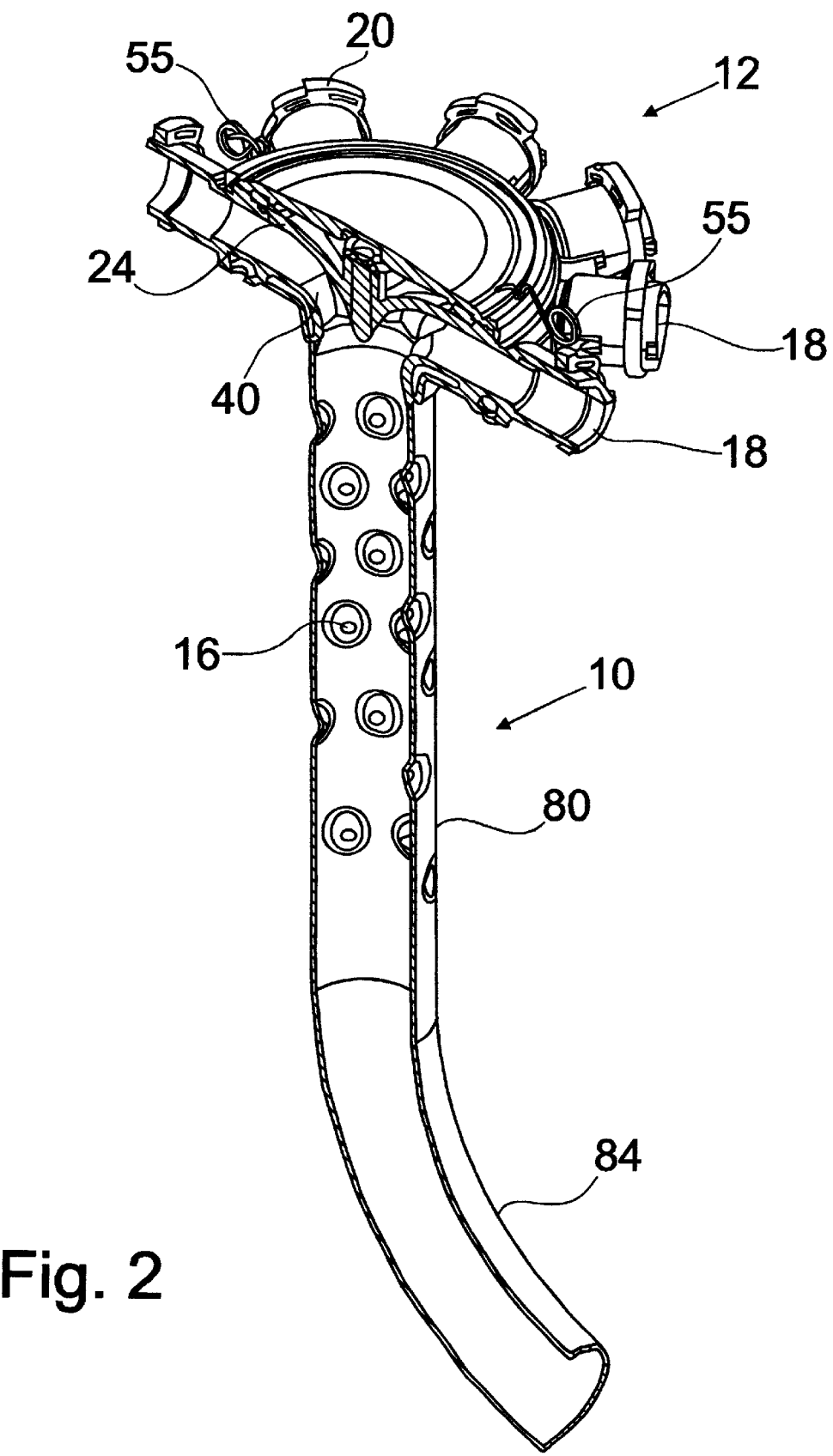
FIG. 2 is a longitudinal section of the conveyor tube and distribution head of FIG. 1 shown in perspective.

Referring firstly to FIGS. 1 and 2 there is shown an upright conveyor tube 10 having a distribution head 12 mounted to the upper end of same. As described in the above-noted patent to Kelm, for example, the lower or inlet end 14 of the conveyor tube receives air-entrained granular material such as seed and/or fertiliser by way of a blower and metering devices (both not shown) mounted on an air cart in a manner well known in the art. As this air-entrained material passes upwardly through the conveyor tube 10, inwardly directed and spaced apart projections 16 disposed in the vertical section of the conveyor tube, and which will be described in full detail hereinafter, serve to impart a controlled degree of turbulence in the upwardly moving flow, which flow then passes into the distribution head 12.

The distribution head 12 is designed to swing the flow from the vertical direction around into horizontal directions and to divide the flow thus received substantially equally among the several outlet ports 18 which extend radially outwardly from the distribution head in equally angularly spaced relationship to each other. These outlet ports 18 are connected to flexible hoses (not shown) secured to ports 18 by clamps 20, each of which hoses leads to a respective delivery tool. Any secondary header may be of similar construction as distribution head 12 and may employ a conveyor tube essentially the same as conveyor tube 10. It is also noted that the novel head 12 and tube 10 may be employed in the primary and/or any secondary distribution system as required to achieve the desired results.) As noted previously, it is of importance that the delivery tools across the width of the machine receive substantially equal flows of product material so as to achieve a coefficient of variation (CV) of substantially less than 15% and preferably a CV not greater than about 5%.

Distribution Head

Figure 5:
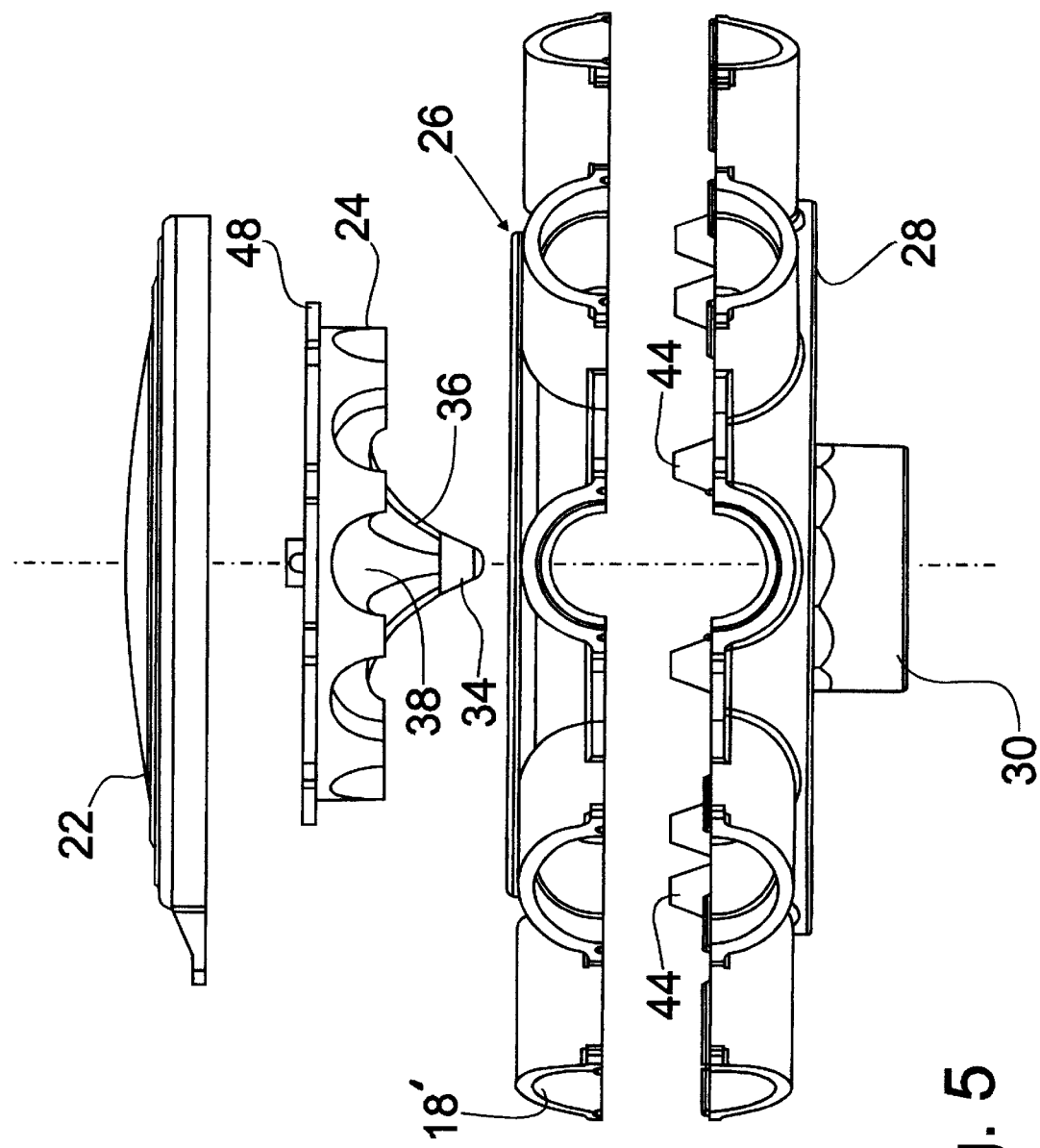
FIG. 5 is an exploded view of the distribution head showing the top lid, flow deflector insert, and the top and bottom sections of the head.
Figures 6, 6A:
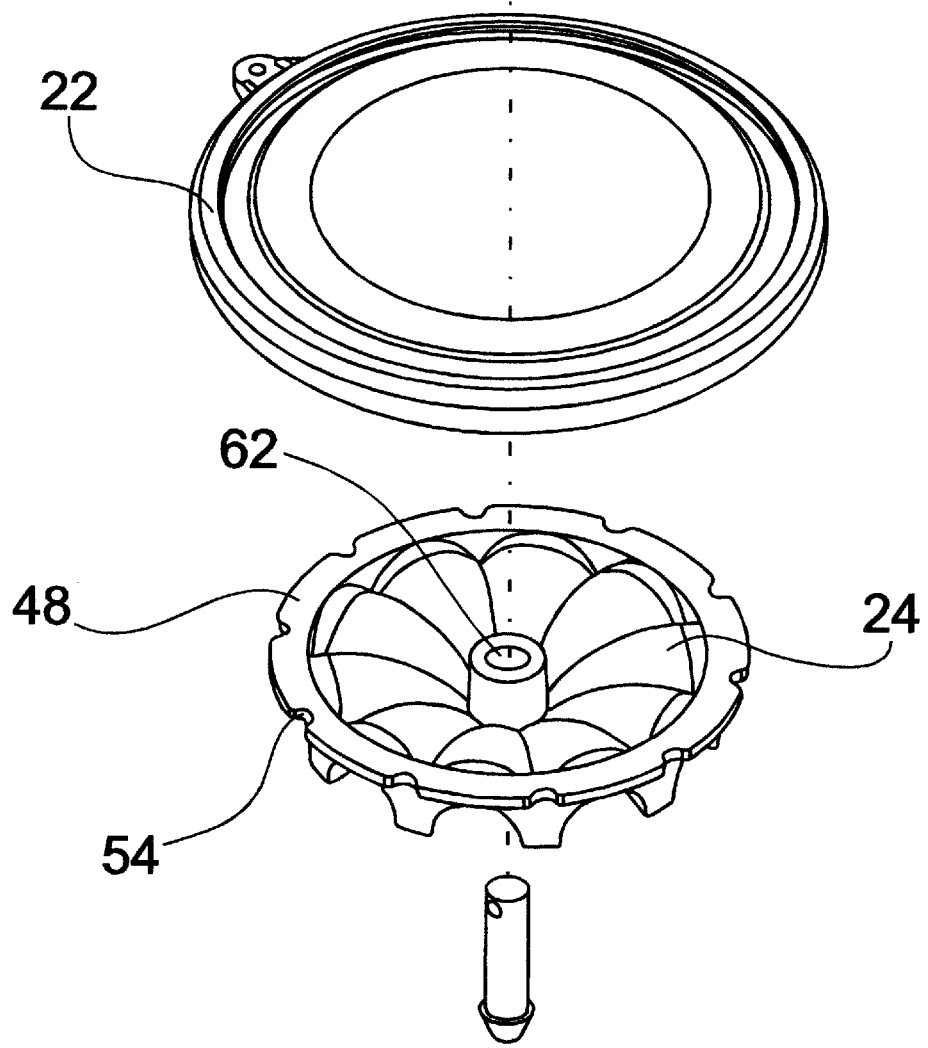
FIG. 6 is a further exploded view of the distribution head but with the several components of same shown in the perspective.
Figure 6B:
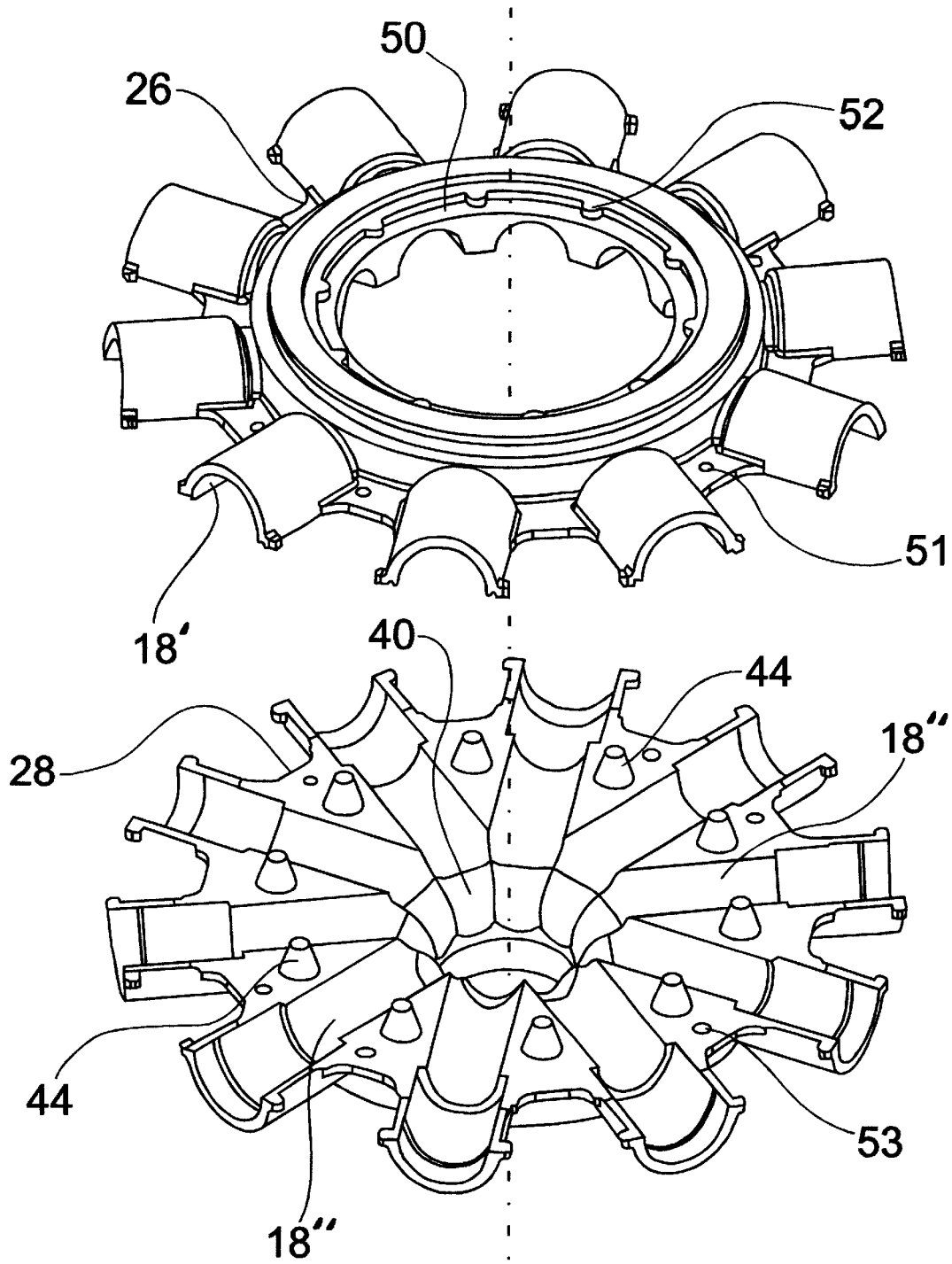

Referring now to FIGS. 5–12, the multi-port distribution head is shown in detail. The distribution header is symmetrical about its central vertical axis designated X—X. As best seen in FIGS. 5 and 6, the distribution head 12 comprises four main parts namely, a top cover 22, a flow deflecting insert 24, a top section 26 and a bottom section 28.

The top and bottom sections 26, 28 as well as the flow deflector 24 are preferably moulded from a polyurethane glass filled plastics material, which material resists wear due to abrasion resulting from the materials being handled and which at the same time provides for economy in the manufacturing processes.

Figure 7:
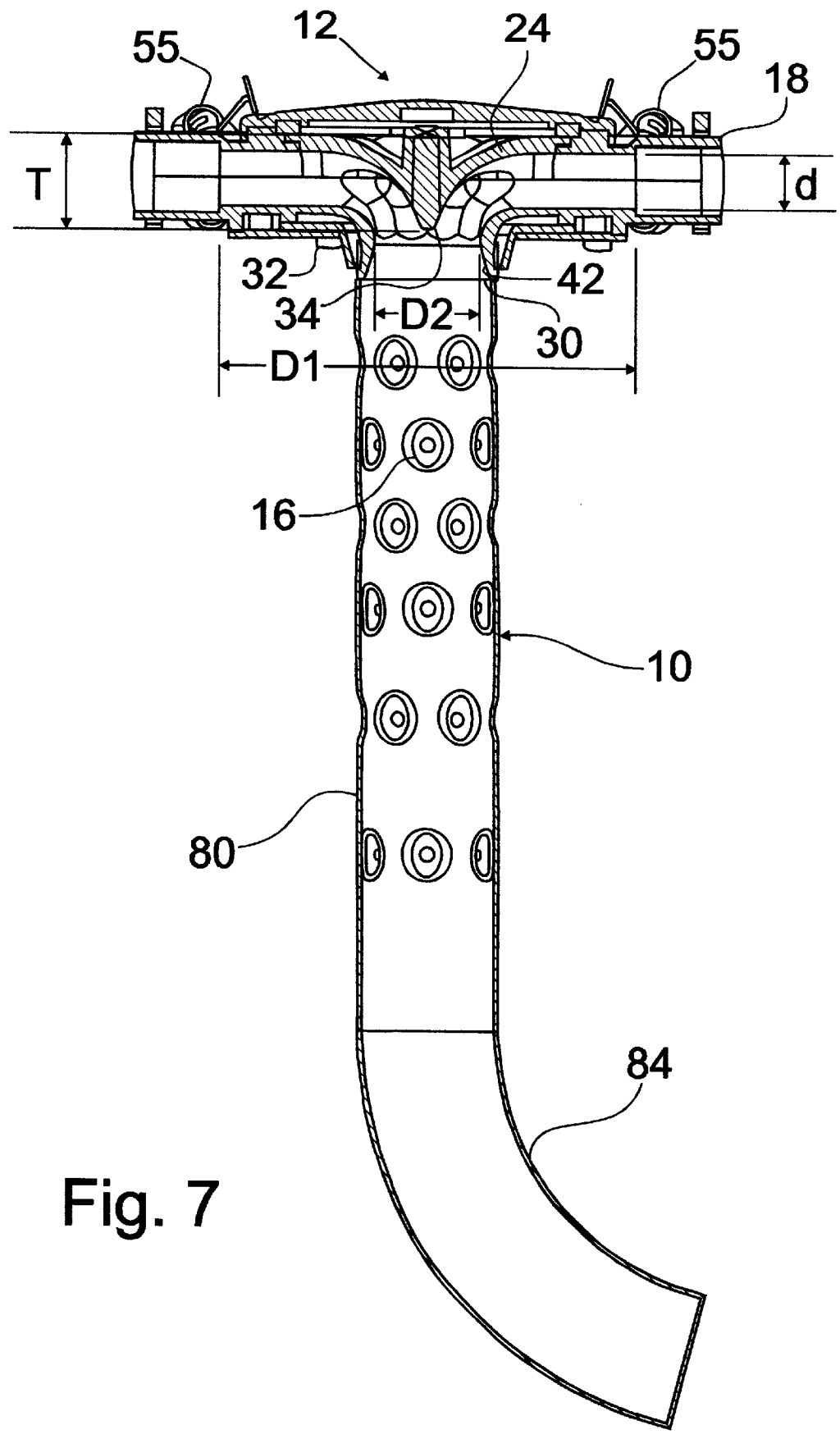
FIG. 7 is a view of the distribution head and conveyor tube in section with the section plane extending along the axis of an opposed pair of outlet ports and lying in the vertical central axis of the distribution head.
Figure 8A:
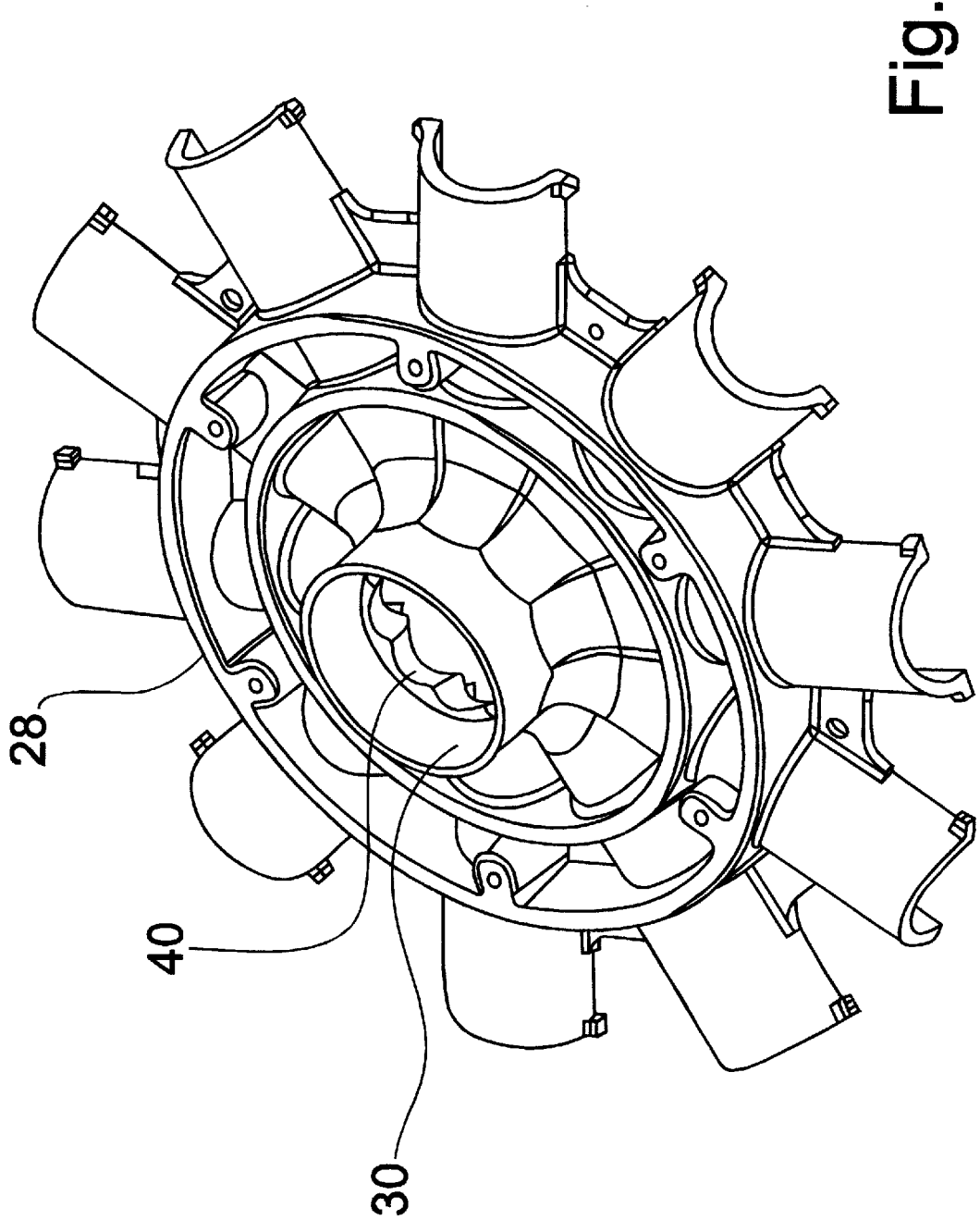
FIGS. 8A is a perspective view of the lower surface of the bottom section of the distribution head.
Figure 8B:
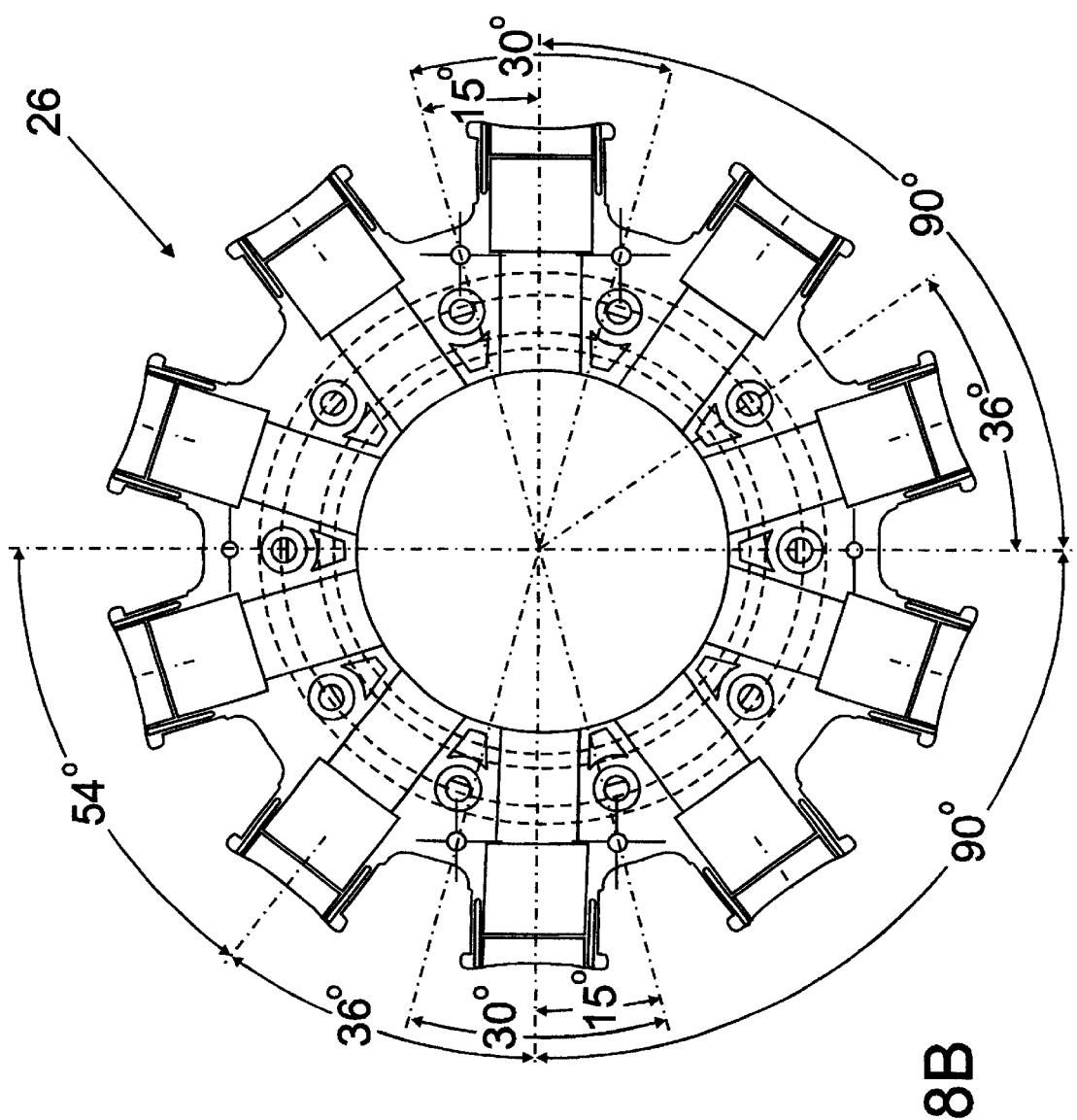
FIG. 8B is a bottom plan view of the top section of the distribution head.
Figure 9:
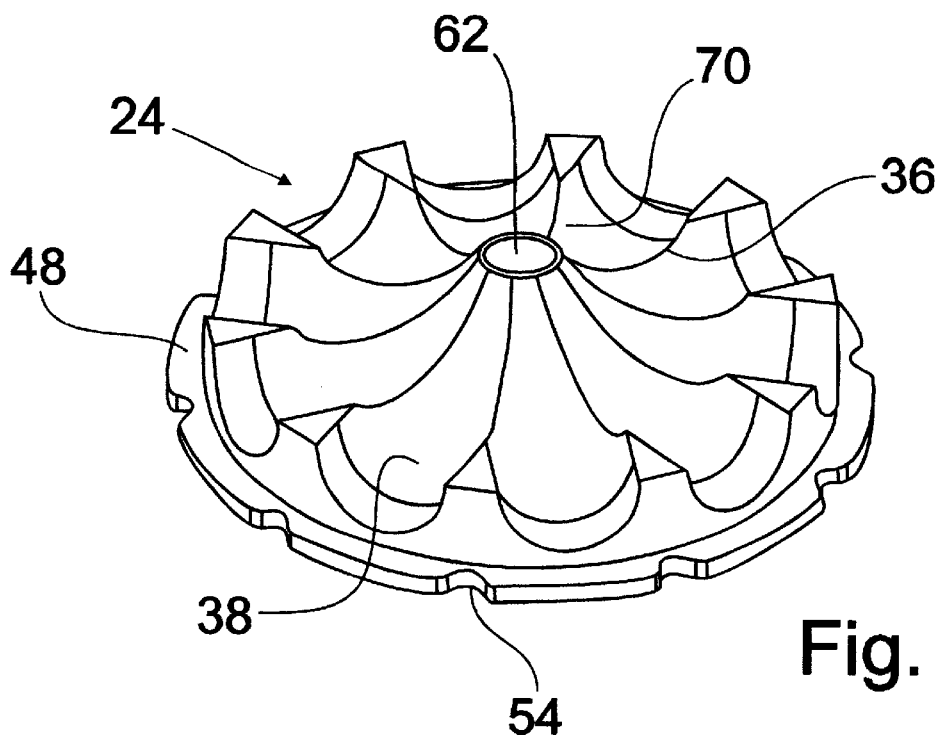
FIG. 9 is a perspective view of the lower surfaces of the flow deflector insert illustrating the shape of the flow confining ridges and contoured valleys between the ridges.
Figure 10:
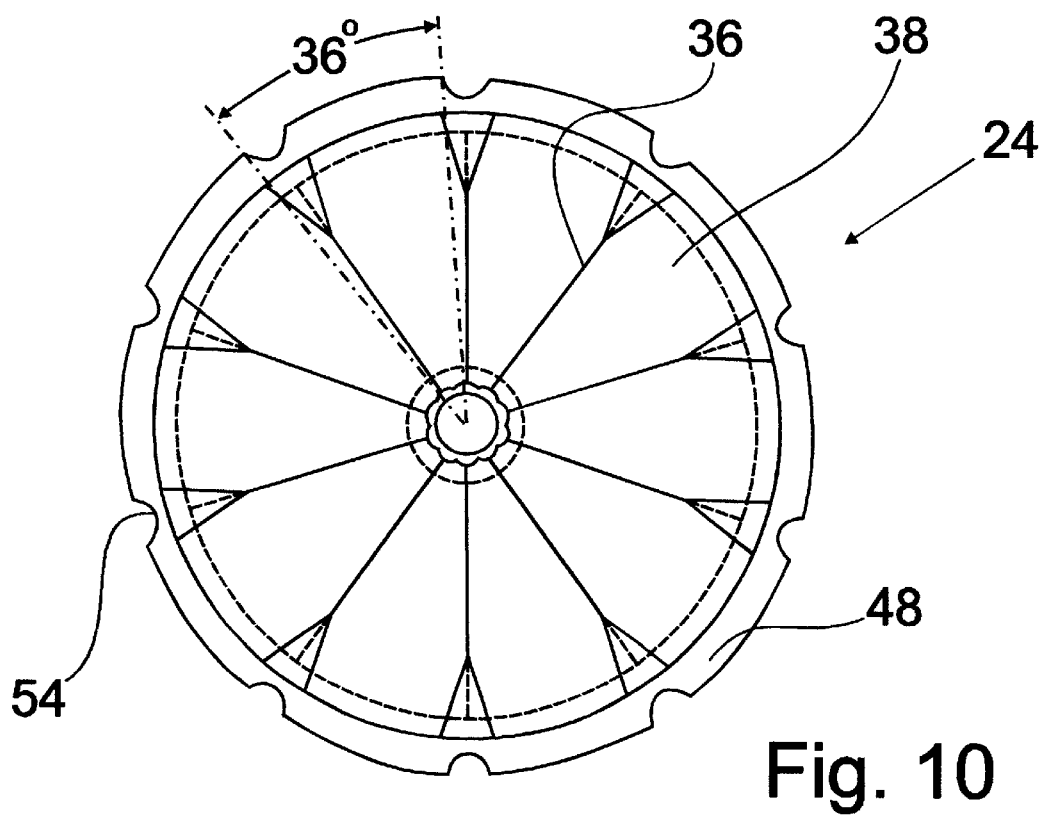
FIGS. 10, 11 and 12 are bottom plan, side elevation and top plan views respectively of the flow deflecting insert illustrated in FIG. 9.
Figure 11:
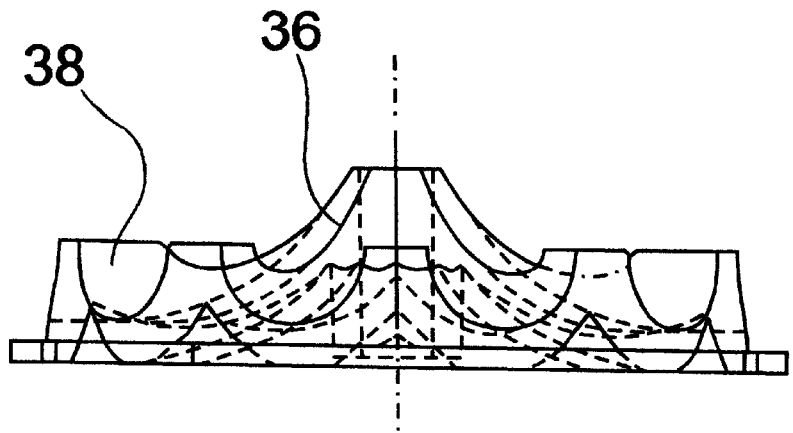
Figure 12:
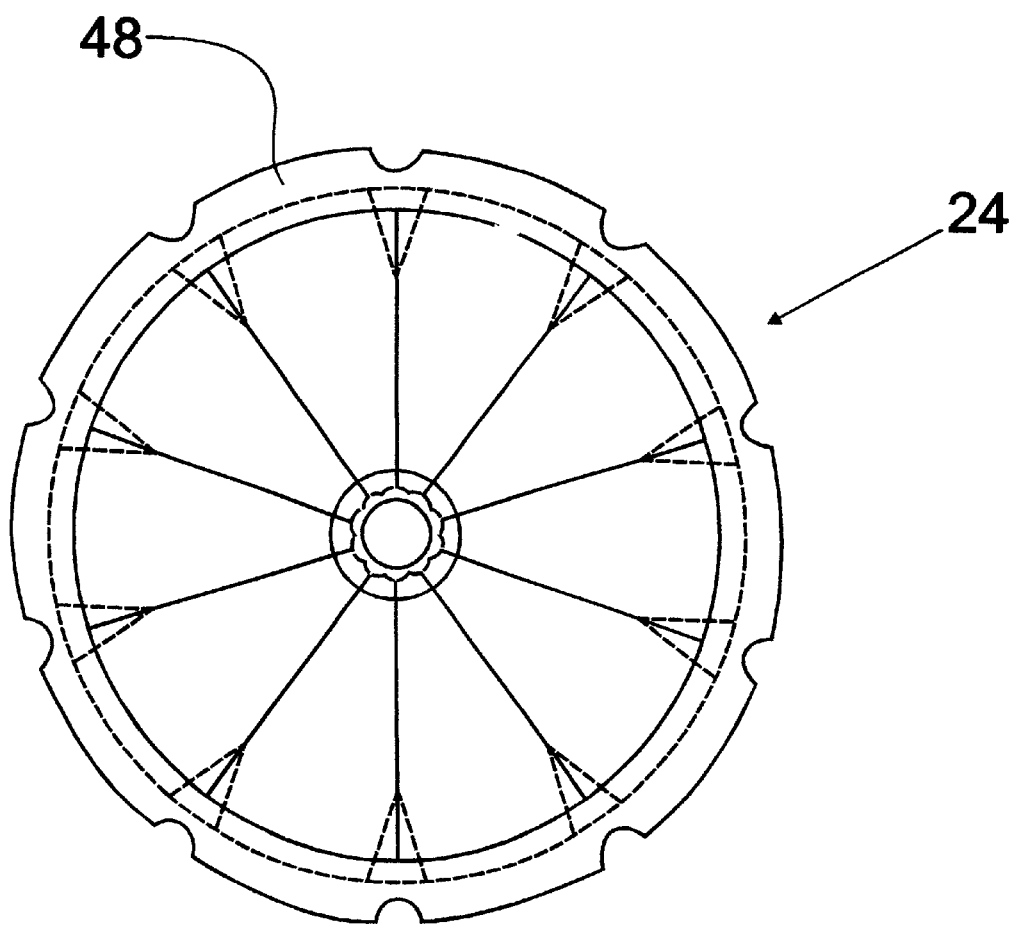

The distribution head 12 is provided with a centrally located flow inlet spigot 30 which is snugly received in the upper end of the conveyor tube 10 (FIGS. 2 and 7). Radial flange 31 fixed to the upper end of conveyor tube 10 is provided with spaced apertures through which fasteners 33 extend into head 12 to secure the latter in position on the upper end of tube 10. The inlet spigot 30 is integrally formed with the bottom section 28 of the head. The top and bottom sections 26, 28 of the head together define the above-noted plurality of radially outwardly projecting outlet ports 18 with said outlet ports extending in equally angularly spaced relationship to each other all around the vertical central axis of symmetry X—X of the distribution head 12 and with the outlet end portions of said ports all lying in a common plane normal to said central axis X—X.

The function of the flow divider insert 24 is to divide the incoming flow received via the flow inlet 30 into substantially equal parts while directing the divided portions of the flow outwardly through the respective outlet ports 18. Accordingly, the distribution head 12 includes a flow divider chamber 32 (FIG. 7) defined within the distribution head 12 with the above-noted flow deflector insert 24 being seated within the top section 26 of the head. The flow deflector 24 (FIGS. 9–12) is provided with a downwardly directed nose 34 accurately centered on the vertical central axis X—X of the distribution head. Flow deflector 24 is also provided with a plurality of radially arranged flow confining ridges 36 separated by smoothly contoured valleys 38 each of which is associated with a respective one of the outlet ports 18. In greater detail, the flow confining ridges 36 commence immediately downstream of the nose 34, initially being very shallow, with said ridges 36 thence curving gradually around from combined radial and axial directions adjacent the nose 34 into generally radial directions while the contoured valleys 38 between the ridges gradually become deeper such that these valleys in the flow deflector insert 24 ultimately coincide or match up with the interior surfaces of the outlet port portions 18_ defined by the top section 26 of the head.

The bottom section 28 of the head 12 is also provided, immediately downstream of the flow inlet spigot 30, with a plurality of shallow concave transition surfaces 40 each of which leads from the inlet spigot into a respective one of the radially disposed outlet port portions 18_ as defined in said bottom section 28. Additionally, the interior surface 42 of the flow inlet spigot 30 gradually tapers inwardly in the direction of the flow to accelerate and centre the flow before it meets the flow deflector insert 24. All of these features serve to ensure that the upwardly moving flow entering via the flow inlet spigot 30 is well centered on the central axis which helps ensure the flow is divided into equal parts and is at the same time smoothly swung around from a vertical direction into substantially horizontal directions and passed in generally equal parts with a minimum of flow restriction outwardly through the respective outlet ports 18.

Generally speaking air flow velocities within the conveyor tube 10 and the distribution header 12 are conventional, i.e. within the range persons skilled in this art would normally use for comparable prior art equipment.

For good results it is important to ensure that the three main sections 24, 26, 28 of the distribution head 12 are accurately fitted together. With reference to FIGS. 5 and 6, for example, it will be noted that the bottom section 28 is provided with a plurality of conical projections 44 disposed in radially spaced apart relationship and each adapted to enter into a correspondingly shaped recess 46 located in the top section 26 of the header. In addition, in order to ensure accurate positioning of the flow deflector insert 24, the outer perimeter of the insert is provided with an outwardly projecting annular ledge 48. This ledge 48 is snugly received in a shallow annular step-like recess 50 provided in the top section 26 of the head 12. This ensures that the flow deflector 24 is accurately centered within the top section 26.

Furthermore, to ensure that the flow deflector 24 is accurately positioned angularly, the step-like recess 50 in the top section is provided with angularly spaced apart semi-circular tabs 52 which co-operate with correspondingly sized semi-circular notches 54 provided in the outwardly projecting flange 48 of the flow deflector 24. Fasteners (not shown) extending through aligned apertures 51, 53 in the top and bottom sections 26, 28 serve to secure these sections together. Flow deflector insert 24 is held in place by the top cover 22 which, in turn, is secured by spaced apart spring clips 55 (FIGS. 2 and 7) of suitable design.

Figure 13:
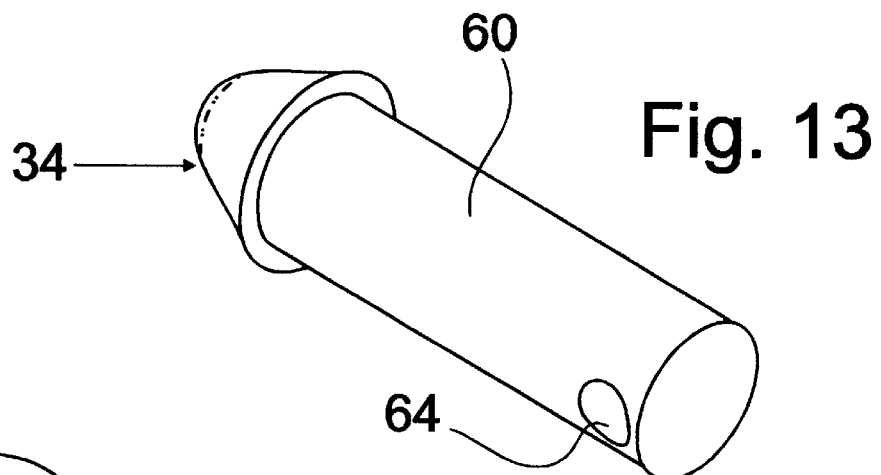
FIGS. 13, 14 and 15 are perspective, end elevation and side elevation views of the nose of the flow deflector insert.
Figure 14:
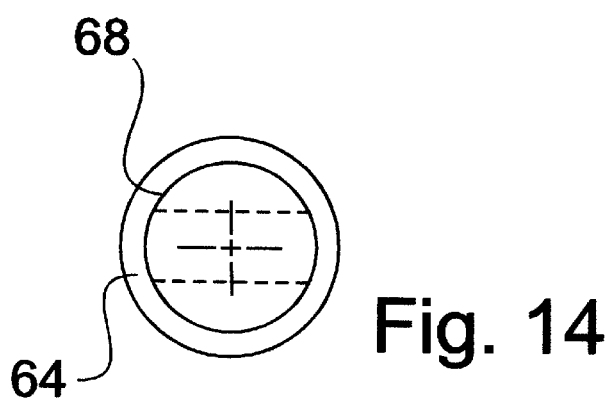
Figure 15:
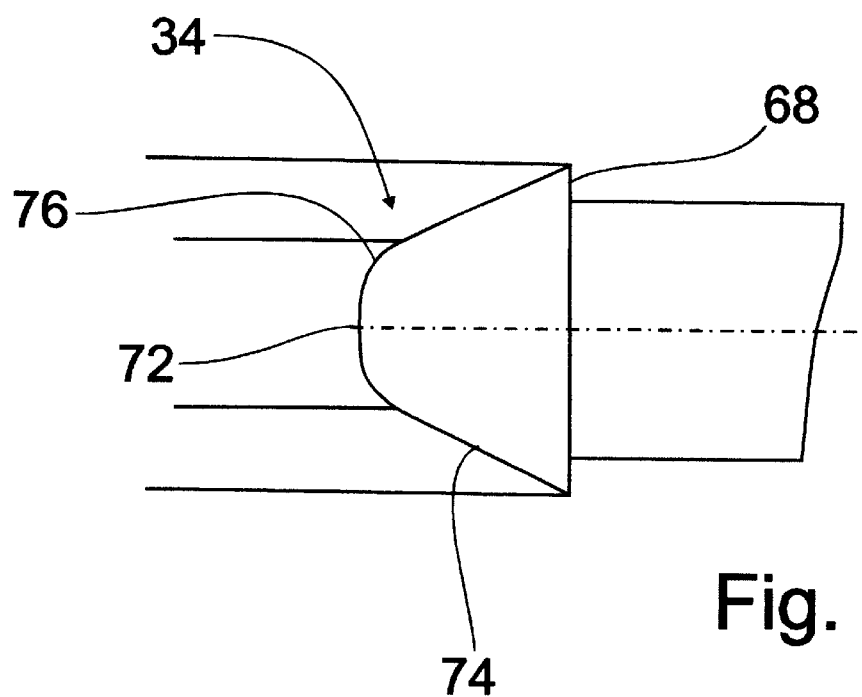

Reference will now be had to the nose 34 of the flow deflector which was briefly referred to above. This nose 34 is shown in detail in FIGS. 13 to 15. The nose 34 has an elongated cylindrical stem 60 which fits snugly into a central bore 62 defined in the flow divider insert. A transverse aperture 64 is provided in the distal end of the stem 60 to receive a pin to retain the nose in the flow deflector 24. The nose 34 is provided with an annular shoulder 68 which abuts up against a narrow annular radially directed surface 70 surrounding the central bore 62 of the flow deflector. The nose 34 is of a generally truncated conical shape with the extreme proximal end 72 of the nose being flat adjacent its central longitudinal axis with such flat portion thence merging with the conical wall 74 of the nose via an arcuately curved annular transition portion 76.

The nose 34 should be made of a relatively hard long wearing material thereby to resist abrasion and wear created by the incoming particulate material which of course impinges heavily on the nose 34 during operation. It is of course important that the nose 34 be absolutely symmetrical all about the central axis X—X of the distribution head 12 since any deviation from symmetry will adversely affect the flow division process.

While the distribution head shown in the drawings is provided with ten outlet ports 18, it should of course be realised that the number of outlet ports 18 can be varied depending upon the circumstances. Commonly used distribution head embodiments employ anywhere from seven to twelve equally angularly spaced outlet ports which are sized to ensure that the flow velocity outwardly of each outlet port is sufficient as to ensure continued entrainment of the materials being conveyed thus assisting in avoiding clogging problems.

The following table provides some typical dimensions for the distribution head, such dimensions being for illustrative purposes only and not for purposes of limitation.

TABLE I (see FIG. 7)

| | |
|---|---|
| D1 - head diameter | 7.5 inches |
| d - radial port inner diameter | 1.5 inches |
| D2 - flow inlet inner diameter | 2.5 inches |
| T - flow deflector top to nose tip distance | 1.625 inches |
| N - number of outlet ports | 7 to 14 |

Conveyor Tube

The upright conveyor tube 10 referred to previously in connection with FIG. 1 will now be described in detail.

As noted previously, the lower or inlet end 14 of the conveyor tube receives the air entrained granular material from the aircart and as the air entrained material passes upwardly through the conveyor tube 10, the multiplicity of inwardly directed and spaced apart projections 16 disposed in the vertical section of the conveyor tube impart a controlled degree of turbulence in the upwardly moving flow, which turbulent flow then passes into the distribution head 12 which acts on the flow in the manner described previously.

As shown in the drawings, FIGS. 1–4, the tube 10 includes a straight section 80 of uniform diameter which is vertically positioned when in use and which has a multiplicity of inwardly directed spaced apart projections 16. These projections 16 form a plurality of spaced annular rows 82, which rows extend around the lengthwise central axis of the tube. The space between at least some of the annular rows 82 decreases in the direction of material travel through the tube 10, i.e. in the direction of flow through the tube from the inlet portion to the outlet portion thereof. As shown in the drawings, annular rows 82 of projections 16 which are closest to the distribution head 12 are more closely spaced than rows nearer to the tube inlet.

For a 2½ inch outside diameter tube with 6 rows of dimples, the spacings starting at the bottom row could be, for example, 2¼, 2, 1½, 1½, 1½ inches, i.e. the smallest spacings are near the outlet end.

The inwardly directed projections 16 are preferably formed by way of "dimples" which are made in the wall of the tube 10 from the exterior, with the relatively thin-wall tube being deformed inwardly to form the corresponding projections 16. The dimples may be made with a round nose punch such that the projections have a semi-spherical or bulbous shape.

It should also be noted that the projections 16 forming the plurality of annular rows 82 are arranged such that projections forming any one row are angularly offset by a selected angle A (FIG. 3) about the lengthwise axis of the tube with respect to the projections 16 of an adjacent row. This ensures that all of the material being conveyed is subjected to a measure of turbulence, particularly material which might otherwise tend to travel closely along an interior surface of the tube.

It will be noted that the lower or inlet end portion 14 of the conveyor tube 10 includes a smoothly curved elbow section 84 leading into the inlet portion of the straight section. The curved elbow section may subtend an angle from about 70 degrees to about 90 degrees although with an increasing angle there is a greater tendency for the material to move away from the center of the tube under the influence of centrifugal force and to follow along the inside wall of the tube 10. Accordingly, this angle should be kept as small as conveniently possible and preferably not greater than about 75.

Another feature of the conveyor tube 10 is that the above-noted straight section 80 has a first space 86 devoid of projections between the elbow section and the first row of projections at the inlet portion and a second space 88 devoid of projections between the last row of projections and the outlet end of the straight section, i.e. the end wherein the inlet spigot of the distribution header is fitted.

A substantial number of tests have been carried out and the results of these tests are set out in Table II which appears as FIG. 16. Some of the variables which are of importance are briefly discussed below.

1. Variable Row Spacing

The varied row spacing has been discussed above. It was found that for constant row spacing, i.e. the row spacing between any two rows being the same, there was an optimum CV value for each product tested. However, to ensure that the conveyor tube 10 worked acceptably well for all products the row spacing was varied as described above and as further noted in the tables. By varying the row spacing an acceptable CV was provided for virtually all products which one might desire to use.

2. Uniform Projection Depth with Projections Concentrically Positioned within the Tube Experiments have revealed that the projections 16 (and the dimples which form them) should be concentric within the tube 10. In one preferred embodiment of the invention the inwardly directed extremities of the projections lie in a base circle having a nominal diameter of about two inches, this base circle of course being centered with the vertical central axis of the straight portion 80 of the tube. This is based on a tube nominal outside diameter of 2.5 inches, the tube wall being of 16 gauge thickness steel. Stated more accurately for this example, it is desirable that the base circle diameter be 2.00 inches+0, minus 0.030 (giving a tolerance range of 1.97 inches to 2.00 inches for this particular example). A range of tube diameters to cover this desired clearance is from about 2.25 to 2.75 inches. It does not appear that tube diameters outside this range will be accepted by the industry.

3. The Top Space is also of Significance

A top space of less than 2 inches appears to be detrimental while 2.5 inches appears to be optimal for most products. This short length of space free of projections appears to give the product being conveyed a short period of time to "even out" before it encounters the distribution head 12. (The bottom space is less important but should be less than about 2½ inches.)

4. The Number of Annular Rows of Projections is also of Some Consequence

For a conveyor tube as described having a nominal diameter of about 2.5 inches 4 to 8 rows of projections could be used but 6 rows of projections are found to work best to allow an acceptable compromise in CV's for all reasonable products.

5. The Number of Columns of Projections is also of Some Consequence

The columns of projections 16 extend in the lengthwise directions of the tubes and the number of columns in the 2.5 inch tube was varied between 8 and 12. Twelve columns of projections provided the most acceptable compromise for all products.

6. Elbow Bend Angle

The elbow bend angle range has been discussed above and while it can be varied between 70 and 90 degrees, the lower the bend angle the better, with the most acceptable compromise in the CVs being at bend angles not greater than about 75.

Figures 3, 4:
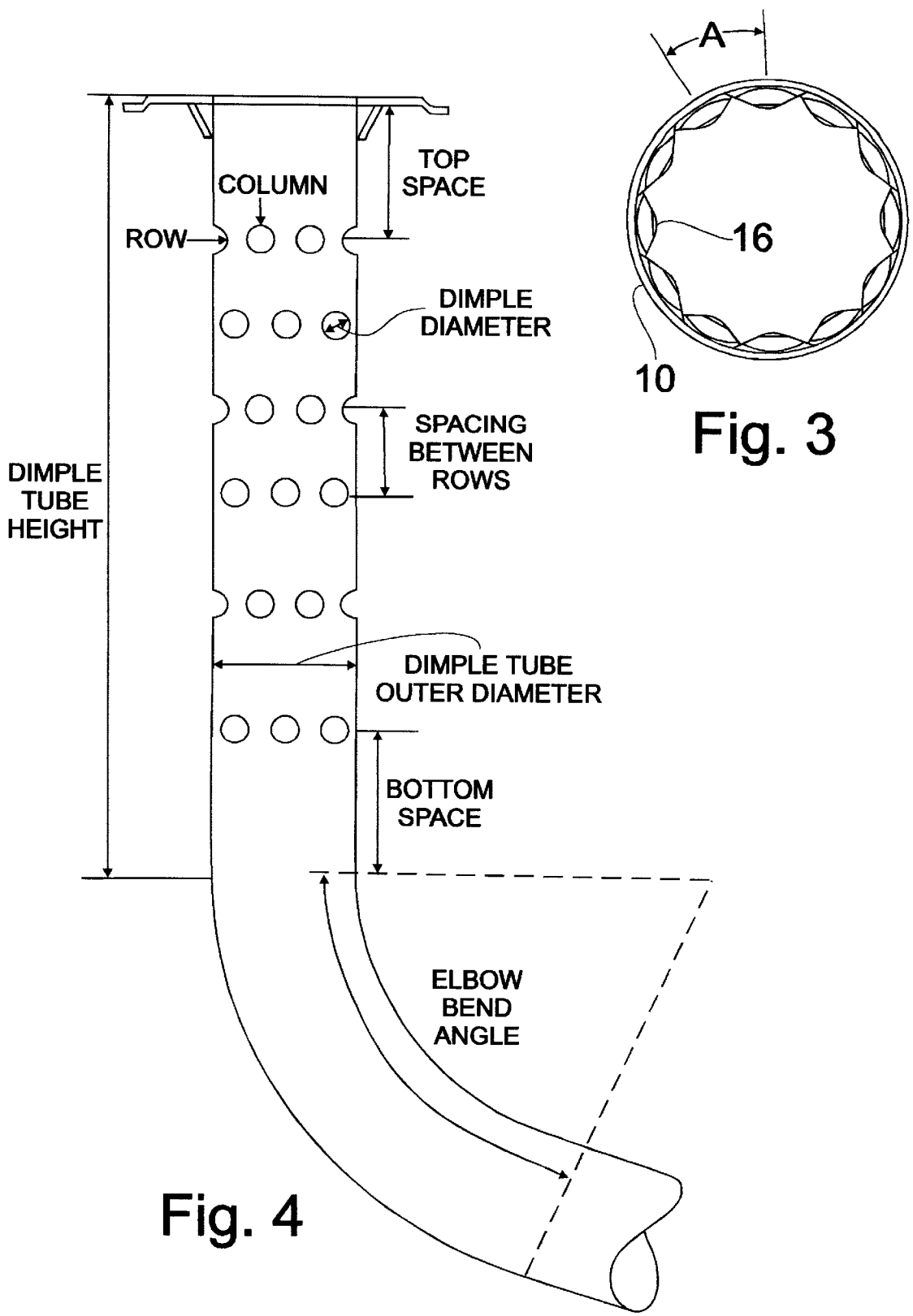
FIG. 3 is a section view of the conveyor tube taken along line 3—3 of FIG. 1 and illustrating the manner in which adjacent rows of projections are angularly offset relative to one another.
FIG. 4 is a further somewhat diagrammatic side elevation view of the conveyor tube wherein several variables affecting the performance have been identified.

The results of extensive tests carried out on various designs of a conveyor tube and the effect on the CVs for various products being conveyed are set out in Table II in some detail. Reference may be had to FIG. 4 for an understanding of the various terms used. Note also the term "dimple" is used in place of the term "projection" in the table, it being understood that they have the same meaning. All of these tests were conducted utilising distribution heads conforming substantially to that described herein. It would be possible to use the conveyor tube with other forms of distribution head but CVs inferior to those shown in the tests could be expected since it is important that the distribution head be capable of functioning in an efficient manner and the distribution head described above has been designed such that it works best with conveyor tubes of the type described herein. In other words, while it is believed that both the conveyor tube as described and the distribution head as described will work reasonably well with other comparable equipment, it is the combination of the two which provides the best results.

With further reference to Table II the tests conducted on the "dimpled" tubes 10 were progressive in nature. One set of tests was used to determine the ideal values for a certain variable at a time. It should be noted that the data tables presented are only representative of the hundreds of tests conducted. It should be noted that the application rate (lb/acre) of the product being tested affects the CV. Only identical products with similar application rates can be compared with one another.

Most of the comparisons are made to analyse the effects of the variables on a variety of products. While all products are important, it should be noted that canola and fertiliser represent opposite ends of the spectrum of product characteristics.

The fixed criteria of the tube essentially were the elbow angle, offset, dimple tube height and diameter.

If the results from test QA are compared with those of test RA, it is seen that canola prefers a narrower dimple spacing while wheat prefers a wider spacing. The results also indicate that canola prefers a large top space and wheat prefers a large bottom space.

Generally, it can be said that canola and high rate fertilisers prefer an aggressive pattern. Wheat seems to prefer a less aggressive pattern. Therefore, it was decided to use only 6 rows at a ³⁄₁₆" dimple depth. The pattern becomes less aggressive and allows more space to be allocated to the top and bottom spaces. The results of test PG confirm this.

The PG test results also reveal something further. Although the dimple pattern is quite aggressive and has a large top space, canola CV's are still quite high. This shows that there is a limit to the ideal top space for canola. A top space of smaller than 2" or larger than 3" will produce adverse effects on canola.

Using the varying row spacing (see "Design" T1 and T6) allows for the requirements all products tested to be met in order to produce acceptable CV's. The less aggressive wide spaced rows of dimples at the bottom are more suited for wheat; the more aggressive closer row spacing at the top is better for canola.

The ultimate goal was to find a pattern that produced acceptable CV's for all range of products. Therefore, the final preferred design settled on (see the test headed "Design") is the best compromise between all the products.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A distribution system which conveys air-entrained material comprising a conveyor tube and a distribution head, said distribution head having a flow inlet for receiving the air-entrained material from said conveyor tube, a plurality of angularly spaced apart outlet ports and relative the tube axis and an internal flow divider means which divides the incoming flow into generally equal parts and radially directs the divided portions of the flow outwardly through the respective outlet ports.

2. The distribution system of claim 1 wherein said flow divider means includes a flow divider chamber defined within said distribution head and a flow deflector disposed within said chamber and having flow confining ridges thereon separated by smoothly contoured valleys each associated with a respective one of said outlet ports.

3. The distribution system of claim 2 wherein said distribution head has a central axis with said flow inlet being aligned with and concentric with said central axis and said outlet ports being in said angularly spaced apart relation and extending radially outwardly from said central axis, said flow deflector having a nose portion centered on said central axis and said flow confining ridges commencing downstream of said nose and curving gradually around from combined axial and radial directions adjacent said nose into generally radial directions while the contoured valleys between said ridges gradually become deeper into said deflector to ultimately merge with interior surfaces of the outlet ports.

4. The distribution system of claim 3 wherein said outlet ports are of circular cross-section and are equally angularly spaced about said central axis with said outlet ports extending normal to said central axis and lying in a common plane.

5. The distribution system of claim 4 wherein said distribution head includes three main sections namely, a bottom section having said inlet therein and having first recesses defining the bottom halves of said ports, a top section adapted to matingly engage said bottom section and having second recesses complementing said first recesses to define said outlet ports, and an insert section defining said flow deflector adapted to seat in said top and bottom sections with said nose portion directed toward said flow inlet and axially aligned therewith.

* * * * *